United States Patent Office 3,478,414
Patented Nov. 18, 1969

3,478,414
WATER WHITE ROSIN FLUX IN BENZYL ALCOHOL SOLUTION
Macy Potter, Pleasant Valley, and William J. Strogis, Beacon, N.Y., assignors to International Business Machines Corporation, Armonk, N.Y., a corporation of New York
No Drawing. Filed May 5, 1967, Ser. No. 637,875
Int. Cl. B23k 35/36, 31/02
U.S. Cl. 29—495                                    4 Claims

ABSTRACT OF THE DISCLOSURE

A composition suitable for use in soldering and similar operations comprising water white rosin and benzyl alcohol.

BACKGROUND OF THE INVENTION

The prior art

This invention relates to a soldering flux and more particularly to a rosin flux without corrosive after effect.

It is well known that chemically active fluxes commonly and effectively used in joining oxidized and dirty metal surfaces are corrosive in nature. Such fluxes may not be used in the electrical and electronic industry because of the corrosive residues which remain in and around soldered joints.

In the highly complex electronic computer art where ceramic modules are employed, it is very important that soldering connections be as clean and uncontaminated as possible and it is therefore a great importance to ascertain that the flux employed leave as little residue as possible behind after the soldering in which it has participated has been completed.

The prior art has for a long time employed rosin generally also known as abietic acid in admixture with isopropyl alcohol which has been available in various concentrations of solids ranging from 40 to about 70%. These concentrations were considered to be the best depending upon the type of soldering operation being performed. Thus, for example, in tinning operation solids content from 40 to 60% was employed, while in chip jointing operations, as much as a 70 weight percent solids concentration of rosin flux would be employed. Concentrations higher than 70% are not thought feasible because there is a tendency for the rosin to crystallize out.

The use of isopropyl alcohol gives rise to several disadvantages, however. Because of its vapor pressure and boiling point characteristics, isopropyl alcohol evaporates very readily, thereby giving rise to a short shelf-life of the rosin flux.

Moreover, isopropyl alcohol rosin fluxes rapidly from a "scum" on their surfaces, thereby requiring frequent replacement.

Moreover, in bonding electrical component chips in a belt furnace, the low boiling point of the isopropanol solvent results in the rapid boil off of the vehicle before the melting point of the solder is reached. This premature boiling also results in the chips becoming misaligned, tilted, etc., thereby resulting in defective bonding.

The evaporation of isopropanol from prior art flux compositions also leads to an increase in the solids concentration resulting in partial decomposition. This increased solids concentration also makes it difficult to encapsulate modules since the encapsulating materials will not bond properly when decomposed flux is present.

Brief description of the invention

To overcome these disadvantages, applicants have discovered that by substituting benzyl alcohol for conventionally employed isopropyl alcohol in rosin flux compositions, many improvements result.

Broadly then, the purpose of this invention is to provide a non-corrosive soldering flux composition consisting essentially of rosin and benzyl alcohol.

DETAILED DESCRIPTION OF THE INVENTION

Due to the high boiling point and low vapor pressure of benzyl alcohol (205° C. and 1 millimeter at 58° C.) the use of this alcohol instead of isopropyl alcohol is much to be preferred since it gives rise to the following advantages.

Benzyl alcohol rosin fluxes have a very long pot life. No "scum" will form at the flux surface as is the case with water white rosin flux in the isopropyl alcohol solutions of the prior art.

Due to the higher boiling point of benzyl alcohol, the rosin decomposition occurs at a much slower rate than with isopropyl alcohol. This results in a more effective and easily controlled fluxing at critical temperatures and the enhancement of the removal of flux residue.

Moreover, the "oily" property of benzyl alcohol and rosin mixtures enables the flux to wet more readily, thereby promoting more uniform solderability.

In applications involving the bonding of electrical component chips in belt furnaces, the agitation and misalignment of the chips is minimized when employing the flux compositions according to the present invention. The high boiling point of benzyl alcohol ensures that the flux composition will endure as a cementing or stabilizing medium prior to fluxing for longer periods of time than when employing isopropanol containing fluxes.

The high flash point of benzyl alcohol renders it a safer vehicle for industrial applications.

The stability of the benzyl alcohol rosin flux compositions renders them especially effective for solder paste applications. Moreover, the oily nature of benzyl alcohol inhibits the tackiness of rosin rendering the flux compositions suitable for automatic dispensing. Moreover, flux "staining," commonly associated with isopropyl alcohol containing fluxes, is greatly reduced or eliminated when using benzyl alcohol fluxes.

In a particularly desirable embodiment, the invention contemplates non-corrosive soldering flux compositions consisting essentially of rosin and benzyl alchohol wherein the amount of rosin solids ranges from 40 to about 70%.

In order to better understand this invention, the following examples are set forth to show the manner in which the flux compositions of the instant invention are utilized.

Example I

An article to be tinned is first immersed in a 40% solution of rosin in benzyl alcohol for 10 seconds at room temperature. Subsequently, the article is immersed in a 10% Sn and 90% Pb solder at 625° F. for 10 seconds. Finally the article is immersed in perchloroethylene to remove flux residue.

The resulting tinner article contains a strongly bonded coating with no trace of flux staining.

Example II

The method of Example I was repeated employing a 60% solution of rosin in benzyl alcohol with similar results.

Example III

Electrical chips were bonded to a suitable substrate according to the following method:

A 70° rosin in benzyl alcohol flux was applied to the substrate and the chips affixed thereto. The assembly was then run through a belt furnace for 2½ minutes.

An average temperature of 300° C. was maintained. The peak temperature reached was 340° C.

The bonded assembly was then cleaned in perchloroethylene as above to remove flux residue. The resulting system comprised electrical chips firmly bonded to the substrate with no trace of staining or misalignment.

The soldering flux of this invention as exemplified above combines the desirable characteristics of corrosion resistance and good spreading characteristics while having good shelf-life properties and resistance to evaporation. These features give an improved composition highly useful in the complex electronics arts where soldering of microcircuits has to be highly exacting.

While this invention has been described by certain specific embodiments, it is not intended to be limited thereto and modifications and variations may be employed within the scope of the following claims.

What is claimed is:

1. A rosin flux alcohol composition consisting essentially of a rosin flux dissolved in benzyl alcohol.
2. The rosin flux alcohol composition of claim 1 wherein the solids content ranges from about 40 to about 70%.
3. A method of soldering electrical connections comprising soldering in the presence of a flux consisting essentially of rosin dissolved in benzyl alcohol.
4. The method of claim 3 wherein the solids content of the flux ranges from about 40 to about 70%.

References Cited

UNITED STATES PATENTS

| 3,086,893 | 4/1963 | Konig | 106—237 |
| 3,127,290 | 3/1964 | Konig | 106—237 |

FOREIGN PATENTS

| 5,402 | 1/1903 | Great Britain. |

OTHER REFERENCES

Mantell et al. "Industrial and Chemical Engineering," 1938, vol. 30, No. 3, pp. 262 to 269.

DONALD E. CZAJA, Primary Examiner

WILLIAM E. PARKER, Assistant Examiner

U.S. Cl. X.R.

106—237; 148—23; 260—97